United States Patent [19]
Itoh et al.
[11] Patent Number: 5,073,861
[45] Date of Patent: Dec. 17, 1991

[54] METHOD OF AND APPARATUS FOR PREVENTING OVERHEATING OF HEATING ELEMENT

[75] Inventors: Toshikazu Itoh; Toshiroh Suemune, both of Tokyo, Japan

[73] Assignee: Oki Electric Industry Co., Ltd., Tokyo, Japan

[21] Appl. No.: 58,888

[22] Filed: Jun. 5, 1987

[30] Foreign Application Priority Data

Jun. 27, 1986 [JP] Japan .............................. 61-149402

[51] Int. Cl.[5] .............................................. G06F 3/12
[52] U.S. Cl. ................................ 364/550; 364/557; 400/120
[58] Field of Search ...................... 364/519, 550, 557; 346/76 PH; 219/216 PH; 400/120

[56] References Cited

U.S. PATENT DOCUMENTS

| | | | |
|---|---|---|---|
| 3,860,861 | 1/1975 | Gucker | 318/473 |
| 4,524,368 | 6/1985 | Inui et al. | 219/216 PH |
| 4,541,747 | 9/1985 | Imaizumi et al. | 318/603 |
| 4,611,155 | 9/1986 | Kurakake | 400/144.2 |
| 4,638,329 | 1/1987 | Nakayama et al. | 346/76 PH |
| 4,649,401 | 3/1987 | Kojima et al. | 364/519 |
| 4,663,734 | 5/1987 | Berry | 364/900 |
| 4,688,051 | 8/1987 | Kawakami et al. | 364/519 |
| 4,978,239 | 12/1990 | Alexander et al. | 400/124 |

OTHER PUBLICATIONS

Patent Abstracts of Japan, vol. 10, No. 196 (M-497) (2252), Jul. 10, 1986; & JP-A-61 41576 (NEC Corp.) 27-02-1986 (Cat. A).
Patent Abstracts of Japan, vol. 10, No. 187 (M-493) (2243), Jul. 2, 1986; & JP-A-61 31277 (Yokigawa Hokushin Electric Corp.), 13-02-1986 (Cat. A).
Patent Abstracts of Japan, vol. 10, No. 21 (M-44) (2078), Jan. 28, 1986; & JP-A-60 180 878 (Jujitsu K.K.) 14-09-1985.

*Primary Examiner*—Parshotam S. Lall
*Assistant Examiner*—Ellis B. Ramirez
*Attorney, Agent, or Firm*—Wenderoth, Lind & Ponack

[57] ABSTRACT

When a first timer, after started, counts a prescribed time interval, and becomes time-out, it is judged whether or not the total of a heat release value exceeds a first prescribed one, and if it does not exceed that value, then the first timer is restarted. If it exceeds, then a second timer is started, and a prescribed pause time is taken, before a heating element is driven, in a time interval when the second timer is counting. When the second timer becomes time-out, it is judged whether or not the total of the heat release value exceeds a second prescribed amount, and if it does exceed that value, the first timer is started. If it exceeds that value, then the second timer is restarted. In such a manner, in the operation of the second timer the prescribed pause time is taken before driving the heating element to make longer a driving period of the heating element than that during the operation of the first timer. Furthermore, the number of times of the operation of the second timer is controlled responsively to the heat release value.

6 Claims, 3 Drawing Sheets

METHOD OF AND APPARATUS FOR PREVENTING OVERHEATING OF HEATING ELEMENT

BACKGROUND OF THE INVENTION

1. Field of the Invention

The present invention relates to a method of and apparatus for preventing overheating of various types of heating elements such as motors and print heads, etc., for use in terminal units of all sorts for protection thereof.

2. Description of the Prior Art

Printers are well known as terminal units. Such a printer includes a line feed motor (hereinafter, referred to simply as an LF motor) for feeding a printing paper for its new line, a spacing motor for moving a print head horizontally, and the print head, all being mounted thereon and regarded as heating elements.

For example, in case of the LF motor, continuous line feed operation thereof over a long period of time causes temperature of windings of the motor to be abnormally raised to result in the baking thereof and the deterioration of the performance thereof. Prior methods solved such problems as follows:

(1) A large rating motor is employed, or the temperature of a motor is prevented from rising over a rated value thereof even if it is rendered to continuous line feed using radiating fins mounted thereon.

(2) An operator's attention is called to an operating manual of a printer specifying that continuous line feed over a long period of time should not be done.

(3) As disclosed in Japanese Laid-Open Patent Publication No. 57-11041, a heat sensitive element is used to determine whether or not the temperature of a heating element exceeds an allowable value. If it exceeds that value, then a required pause time interval is placed in a drive period of driving power applied to the heating element to permit heat dissipation to be effected during that pause time interval.

However, those methods to solve the aforementioned difficulties respectively suffered from the following problems:

The countermeasure (1) exerts itself for continuous operation for many hours not experienced in ordinary applications, which can never be said to be effective to result in the device cost increased. The countermeasure (2) can not prevent a motor from being overheated when an operator does not obey directions of the device for use and when there is any trouble in a host computer connected to a printer. Furthermore, the countermeasure (3) necessitates a heat sensitive element to result in the apparatus cost increased.

SUMMARY OF THE INVENTION

In view of the drawbacks of the prior methods, it is an object of the present invention to provide a method of and apparatus for preventing overheating of a heating element inexpensively.

To achieve the above object, the method of and apparatus for preventing overheating of a heating element employs a first timer for counting a prescribed first time interval $t_1$, a second timer for counting a prescribed second time interval $t_2$, a means for evaluating a heat release value of the heating element in prescribed time intervals on the basis of the number of times of driving the heating element whilst those timers are counting the prescribed time intervals, and adding the heat release value so evaluated to the total of a heat release value from the heating element theretofore to further evaluate the total of a new heat value, a means for subtracting an allowable heat release value of the heating element for the first time interval $t_1$ from the total of the heat value evaluated just above and storing the remainder of the subtraction executed above as the total of a new heat value, and means for subtracting an allowable heat value of the heating element for the second time interval $t_2$ from the total of the heat release value evaluated just above and storing the remainder as the total of a new heat value. The method further consists of the steps of: setting the total of a heat release value from the heating element to "0" after powering the first timer; subtracting the allowable heat release value of the heating element for the first time interval $t_1$ from the total of the heat release value when the first timer counts the prescribed time interval $t_1$; setting the total of the heat release value to "0" to restart the first timer when the remainder of the subtraction is "0" or a negative value while starting the second timer unless the remainder is "0" or a negative value; subtracting the allowable heat release value of the heating element for the second time interval $t_2$ from the total of the heat release value when the second timer counts the prescribed time interval $t_2$; setting the total of the heat release value to "0" to start the first timer if the remainder is "0" or a negative value while restarting the second timer unless the remainder is "0" or a negative value; and placing a prescribed pause time prior to driving the heating element only in a time interval when the second timer is counting.

According to the present invention, the first timer is powered for the start thereof. It is judged when the first timer counts a prescribed time interval and becomes its time-out, whether or not the total of a heat release value from the heating element exceeds a first prescribed amount. Unless it exceeds that amount, the first timer is restarted. While, if it exceeds, then the second timer is started, and a prescribed pause time is placed in a time interval when this timer is counting prior to driving the heating element. When the second timer becomes time-out, it is judged whether or not the total of the heat release value exceeds a second prescribed amount. Unless it exceeds the latter amount, then the first timer is started. If it exceeds, then the second timer is restarted.

According to the present invention, as described above, the prescribed pause time is placed in the counting operation of the second timer prior to driving the heating element to permit a driven period of the heating element to be made longer than that in the operation of the first timer, and furthermore the number of times of operations of the second timer is controlled responsively to the heat release value. Thus, the method of and apparatus for preventing overheating of a heating element to solve the aforementioned difficulties can be achieved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

In what follows, an embodiment of a method of and apparatus for preventing overheating of a heating element according to the present invention will be described with use of an LF motor of a printer as an example.

Figure 2:
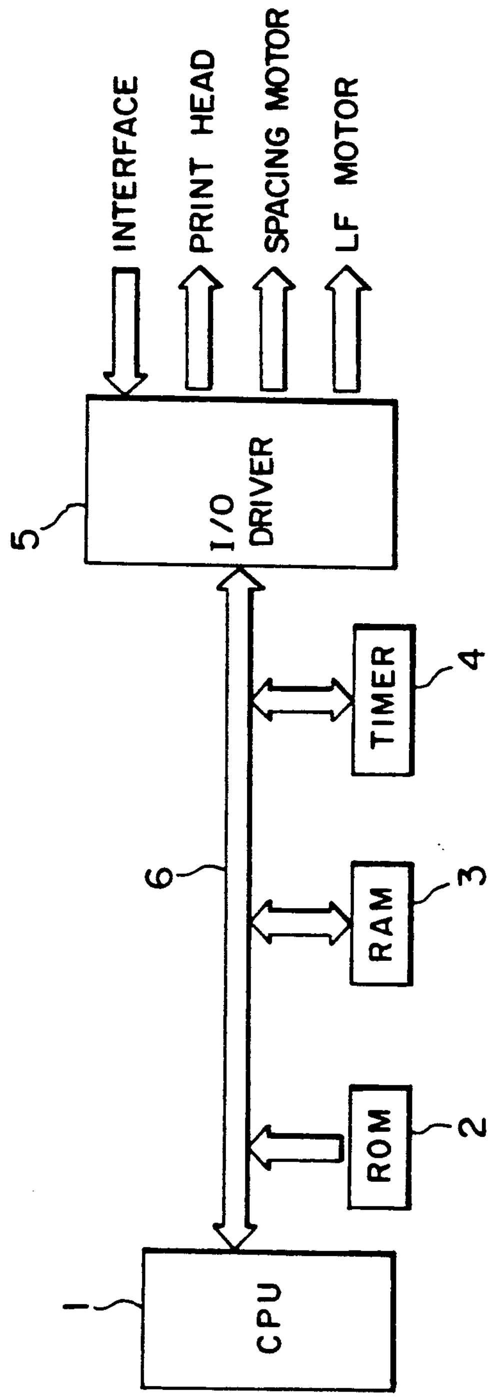
FIG. 2 is a schematical block diagram of a printer control part.

Referring first to FIG. 2 schematically illustrating a printer control part, designated at 1 is a CPU, 2 is a ROM for storing a program and fixed data, 3 is a RAM for storing data, etc., received from the outside, 4 are timers, 5 is an I/O driver operated on the basis of an instruction from the CPU 1, and 6 is a bus line. The I/O driver 5 is connected with an interface circuit, a print head, a spacing motor, and an LF motor, all these members being external device and not shown here.

Operation of the printer control part arranged as such is as follows:

Once the CPU 1 receives printing data (typically character codes) and control data (character pitches and the amount of line feed etc., which are usually called control codes) from the interface circuit not shown via the I/O driver 5, it stores this received data in the RAM 3. When the CPU 1 receives the printing data of one line, it drives the spacing motor (not shown) via the I/O driver 5. In addition, the CPU 1 reads the printing data (character codes) from the RAM 3 to convert it to a prescribed dot pattern and transmits the dot pattern so converted to the print head (not shown) via the I/O driver 5. The print head as receiving that dot pattern effects printing in prescribed timing. The CPU 1, after the printing of one line is effected as such, drives the LF motor (not shown) via the I/O driver 5. This renders the print head to line feed. For a technique of generating line feed timing, a method is known wherein a stepping motor is employed as the LF motor and the timer 4 provides timing to permit the stepping motor to step forward under control of the CPU 1.

In succession, a method of preventing the LF motor from being overheated will be described with reference to the flowchart of FIG. 1 and the timing diagram of FIG. 3.

Figure 1:
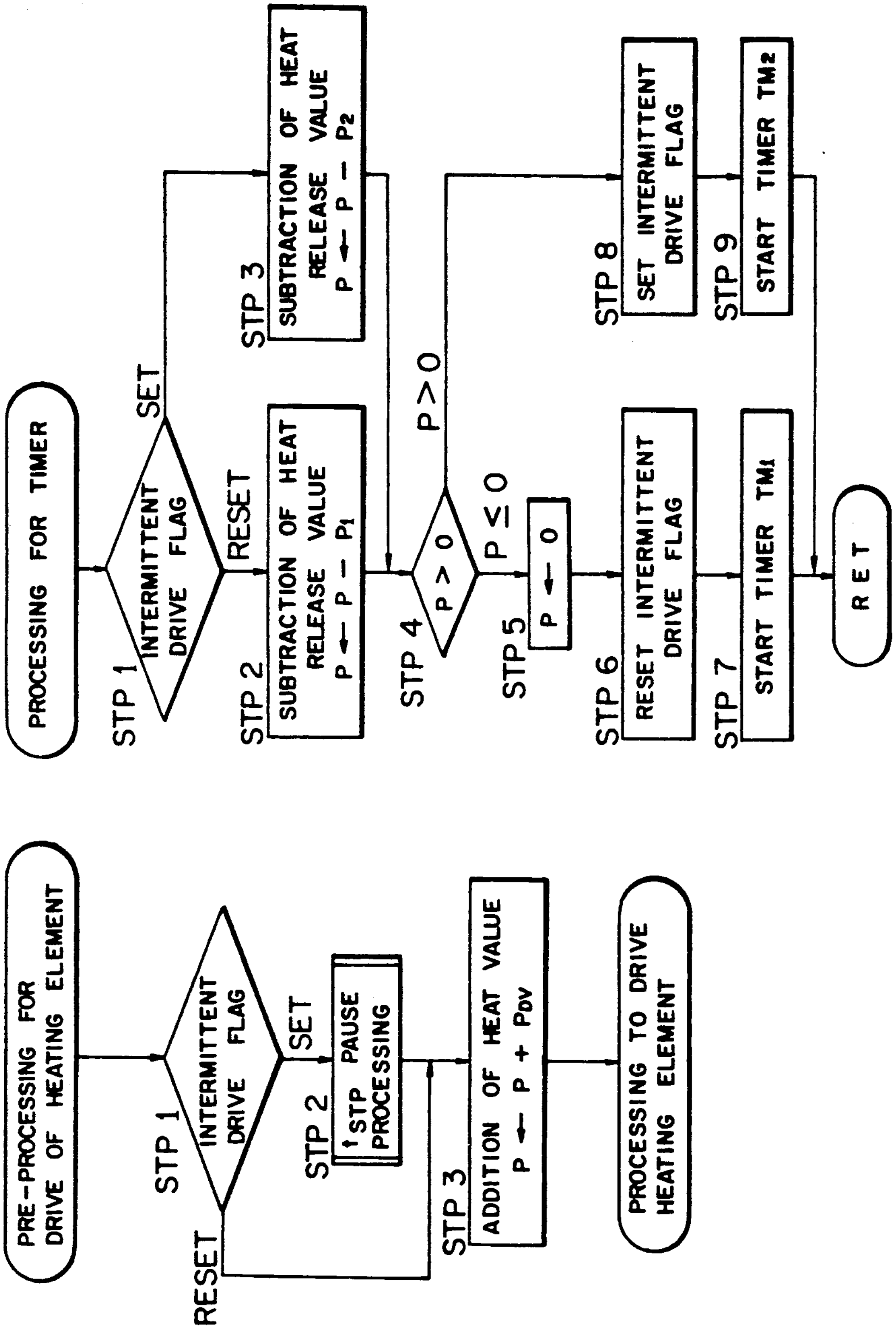
FIG. 1 is a flowchart illustrating a method of and apparatus for preventing overheating of a heating element according to the present invention.

Turned on a power source to the printer (at a time point of P-on of FIG. 3), various registers (a P register for storing the total P of a heat release value, a $P_{DV}$ register for storing heat release values $P_{DV}$, $P_1$, and $P_2$, a $P_1$ register, a $P_2$ register, and an intermittent drive flag register, shown in FIG. 1) are reset to start a first timer $TM_1$ in conformity with an initial setting program stored in the ROM 2. The control then advances to timer processing shown in FIG. 1 as the timer $TM_1$ counts only a prescribed time interval $t_1$. In STEP 1, it is checked that a flag in the intermittent drive flag register is set. In the present situation the flag is not set and so the control advances to STP 2. In STP 2, the contents $P_1$ of the $P_1$ register is subtracted from the contents P of the P register, and the remainder $(P-P_1)$ of this subtraction is stored in the P register. The contents of the $P_1$ register, i.e., the heat release value $P_1$ and the contents of the $P_2$ register, i.e., the heat release value $P_2$ will be described here.

The heat release value $P_1$ indicates an allowable heat release value of the LF motor in the time interval $t_1$ (time interval set in the timer $TM_1$), which can be substituted for the number $N_{LF1}$ of line feed pulses within that time interval assuming that a heat release pulses per line feed pulse is constant. Here, the $N_{LF1}$ is the number of line feed pulses allowed within the time interval $t_1$. In addition, the heat release value $P_2$ means an allowable heat release value of the LF motor in the time interval $t_2$ (a time interval set in a timer $TM_2$ described later), which can be substituted for the number $N_{LF2}$ of line feed pulses within that time interval on the assumption that a heat release value per line feed pulse is constant as described above. Hereupon, the $N_{LF2}$ is the number of line feed pulses allowed in the time interval $t_2$.

Here, the description will be returned to the original one and continued.

In STP 4, it is checked that the contents of the P register is less than "0". That is, it is checked that the total P of the heat release value exceeds the allowable heat release value $P_1$. $P \leqq 0$ holds here, and hence the control advances to STP 5. Hereinafter, in STP 5 the P register is reset, in STP 6 the intermittent drive flag register is reset, and in STP 7 the timer $TM_1$ is restarted. Once the timer $TM_1$ counts again only the prescribed time interval $t_1$, the same processing as described previously is performed. Thereafter, this operation is repeated.

To achieve the method mentioned above, provided is an apparatus for preventing overheating of a heating element. The apparatus comprises a first timer $TM_1$, for counting a prescribed first time interval $t_1$; a second timer $TM_2$ for counting a prescribed second time interval $t_2$; evaluation means for evaluating a heat release value of the heating element within the prescribed time counted by any of the first and second timers $TM_1$, $TM_2$, on the basis of the number of times of driving of the heating element whilst the both timers $TM_1$, $TM_2$ are respectively counting the prescribed times and further adding the total of the heat release value up to that time to the heat release value evaluated previously to evaluate the total of a new heat release value; first means such as $P_1$ register for subtracting an allowable heat release value $P_1$ of the heating element for the first time interval from the total of the heat release value and storing the remainder $P-P_1$, of the subtraction as the total of a new heat release value; and second means such as $P_2$ register for subtracting an allowable heat release value $P_2$ of the heating element for the second time interval $t_2$ from the total of the heat release value and storing the remainder $P-P_2$ of the subtraction as the total of a new heat release value.

The heating element mentioned above is a line feed motor for use in a printer. The evaluation means for evaluating a heat release value of the heating element is a CPU.

The apparatus for preventing overheating of a heating element further includes a ROM 2 for storing a program for execution of the present method of preventing overheating of a heating element and for storing fixed data for use in the execution of the present method, a RAM 3 for storing any received data in need of the execution of the present method of preventing overheating of a heating element and received from the outside, an I/O driver 5 for driving the heating element, etc., in conformity with an instruction, from said CPU 1, and a bus line for connection said CPU 1, ROM 2, RAM 3, timers $TM_1$, $TM_2$, and I/O driver 5 in this order.

Operation if the circumstances require the LF motor to be driven whilst the operation described above is being repeated will be described.

In the present invention, preprocessing for driving the heating element shown in FIG. 1 is conducted without fail before driving the LF motor. First, in STP 1, it is checked that a flag of the intermittent drive flag register is set. Since here the intermittent drive flag is reset, the control advances to STP 3. In STP 3, the contents $P_{DV}$ of the $P_{DV}$ register are added to the contents P of the P register, and the result $(P+P_{DV})$ is stored in the P register. Here, the contents of the $P_{DV}$ register, that is, the heat release value $P_{DV}$ are a heat release value produced upon line feed operation, and assuming a heat release vale per line feed pulse to be constant, that value can be substituted for the number of line feed pulses $N_{LFDV}$. After execution of the processing in STP 3, processing for driving the heat element, that is, driving of the LF motor is effected. Thereafter, the operation described above is repeated. A change in the contents of the P register upon conducting the LF operation continuously is illustrated in (c) of FIG. 3.

Once the timer $TM_1$ counts only the prescribed time interval $t_1$ and reaches a time point $T_1$, the program advances to the timer processing shown in FIG. 1. Here, the program advances from STP 1 to STP 2. In STP 2, subtraction between heat release values is executed in the same manner as in the above description. Thereupon, since the contents of the P register become $n_1{}^xP_{DV}$ ($n_1$ is the number of times of line feeds within the prescribed time $t_1$). the total P of a heat release value after the subtraction can be expressed by the following expression:

$$n_1{}^x(P_{DV})-P_1 \tag{1}$$

Replacing P in (1) with the number of line feed pulses, $$N_{LF}=n_1{}^x(N_{LFDV})-N_{LF1} \tag{2}$$

holds (here, $N_{LF}$ indicates the number of line feed pulses corresponding to the heat release value P). Here, supposing the contents of the P register to exceed $P_1$ before the time point $T_1$ is attained as shown in (b) of FIG. 3, $P>0$ holds in STP 4, and hence the program advances from STP 4 to STP 8. In STP 8, a flag of the intermittent drive flag register is set (refer to (c) of FIG. 3). In STP 9, the timer $TM_2$ is started.

After a while, in order to drive the LF motor, the operation again enters the preprocessing for driving the heating element shown in FIG. 1.

Thereupon, since the intermittent drive flag has already been set as described previously, the operation advances from STP 1 to STP 2. In STP 2, the operation, after a prescribed pause time, advances to the next STP 3. In STP 3, addition of heat release values is executed as described before. Thereafter, before driving the LF motor the operation described above is effected.

After a while, once the timer $TM_2$ counts only a prescribed time interval $t_2$ and a time point $T_2$ is reached, the operation again enters the timer processing shown in FIG. 1. At this time, the intermittent drive flag has already been set as described previously, the operation advances from STP 1 STP 3. In STP 3, subtraction between heat release values are executed. Thereupon, since the contents of the P register have become a value $(n_1.P_{DV}-P_1)$ + $n_{21}.P_{DV}$ yielded by adding $n_{21}.P_{DV}$ ($n_{21}$ is the number of line feeds conducted from the time point $T_1$ to $T_2$) to $n_1 \cdot P_{DV}-P_1$ (this is the result operated in the previous STP 2), the total P of the heat release value after the operation can be expressed by the following expression:

$$P=(n_1 \cdot P_{DV}-P_1)+n_{21} \cdot P_{DV}-P_2 \tag{3}$$

Replaceing P in (3) with the number of line feed pulses, $$N_{LF}=(n_1 \cdot N_{LFDV}-N_{LF1})+n_2 \cdot N_{LFDV}-N_{LF2} \tag{4}$$

holds. Here, supposing the contents of the P register to exceed $P_2$ before the former reaches the time point $T_2$ as shown in FIG. 3 (*b*), the operation advances from STP 4 to STP 8, STP 9, and in STP 9 the operation permits the intermittent drive flag to remain set for restarting the timer $M_2$.

After a while, when the timer $TM_2$ counts only the prescribed time $t_2$ to permit the time point $T_2$ to be reached, the operation again enters the timer processing shown in FIG. 1. Also in this case, the operation advances from STP 1 to STP 3, in which it evaluates subtraction between heat release values. Thereupon, the total P of a heat release value after the subtraction can be expressed by the following expression:

$$P=(n_1 \cdot P_{DV}-P_1)+n_{21} \cdot P_{DV}-P_2+n_{22} \cdot P_{DV}-P_2 \tag{5}$$

Replacing P in (5) with the number of line feed pulses, (where, $n_{22}$ is the number of times of line feeds from the time point $T_2$ to $T_3$)

$$N_{LF}=(n_1 \cdot N_{LFDV}-N_{LF1})+n_{21} \cdot N_{LFDV}-N_{LF2}+n_{22} \cdot N_{LFDV}-N_{LF2} \tag{6}$$

holds.

Figure 3:
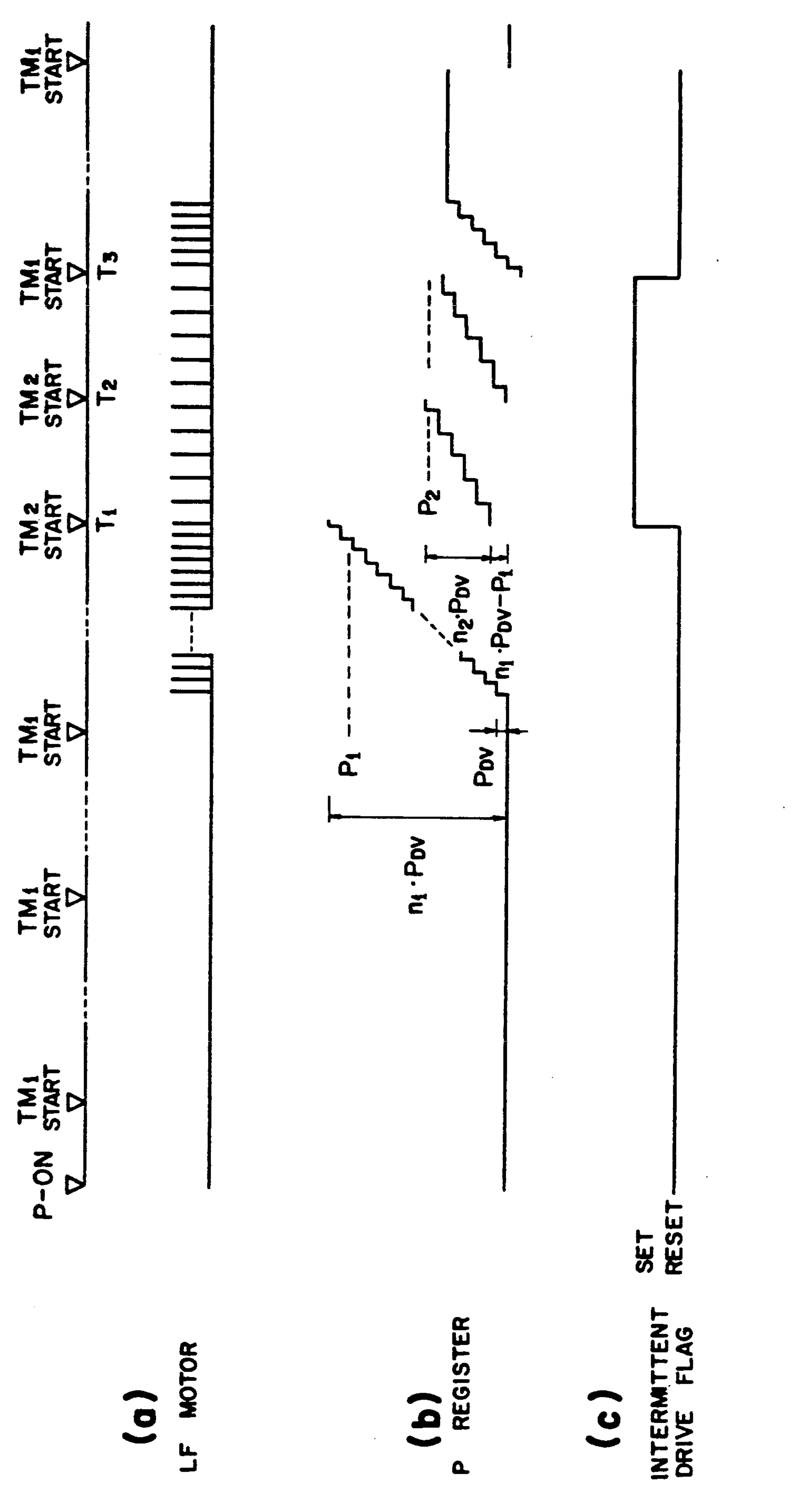
FIG. 3 is a timing diagram illustrating the method of and apparatus for preventing overheating of a heating element of FIG. 1.

Supposing here the contents of the P register not to reach $P_2$ before the time point $T_3$ is reached as shown to FIG. 3 (*b*), in STP 4 $P \leqq 0$ holds, and hence the operation advances from STP 4 to STP 5 and to STP 6 in which the operation resets the P register and the intermittent drive flag register. In addition, in STP 7 the operation starts the timer $TM_1$.

Although in the example of FIG. 3, after the operation passed twice through STP 3, $P \leqq 0$ was yielded, if after it passes once through STP 3 and $P<0$ is attained, then the expressions (5) and (6) are reduced to the following expression (7) and (8):

$$P=(n_1 \cdot P_{DV}-P_1)+\sum_{k=1}^{i}(n_{2k} \cdot P_{DV}-P_2) \tag{7}$$

(where, $n_{2k}$ is the number of times of line feeds during the kth prescribed time interval $t_2$) and $$N_{LF}=(n_1 \cdot N_{LFDV}-N_{LF1})+\sum_{k=1}^{i}(n_{2k} \cdot N_{LFDV}-N_{LF2}) \tag{8}$$

In the above description, assuming $t_1>t_2$, the following effect can be assured. Namely, it is piecemeal judged whether or not the heat release value of a heating element becomes less than a prescribed one, for thereby improving the throughput.

According to the present invention, as described above, two kinds of time intervals are set by means of the first and second timers, and in the time interval set by the second timer a prescribed pause interval is taken before driving a heating element to make longer a period of driving the heating element than the time interval set by the first timer. Furthermore, the number of times of operations of the second timer is controlled in response to the heat release value to prevent the heating element from being overheated. Accordingly, it becomes unnecessary to use large rating heating elements, heat radiating fins, and heat sensitive elements as in prior techniques, whereby the device cost can be reduced. Moreover, the method of the present invention can prevent overheating of a heating element without having bad effects thereon of its erroneous use by an operator and any trouble in a host computer to assume the secure operation of the concerning device.

Although a certain preferred embodiment has been shown and described, it should be understood that many changes and modifications may be made therein without departing from the scope of the appended claims.

What is claimed is:

1. A method of driving a heating element and preventing overheating of the heating element, the method comprising the steps of:

(a) setting the total of a heat release value to "0" after powering a first timer so as to start said first timer, said first timer serving to count a prescribed first time interval; then, (b) subtracting a first allowable heat release value of the heating element from a total value of the heat released by the heating element at the end of said first time interval to obtain a first remainder, and returning to step (a) when said first remainder is a non-positive value, while proceeding to step (c) when said first remainder is any value other than non-positive values;

(c) starting a second timer, said second timer serving to count a prescribed second time interval; then, (d) subtracting a second allowable heat release value of the heating element from a total value of the heat released by the heating element at the end of said second time interval to obtain a second remainder, and returning to step (a) when said second remainder of said subtraction is a non-positive value, while returning to step (c) when said second remainder is any value other than non-positive values;

wherein a prescribed pause time is provided before driving the heating element only during the time interval counted by said second timer, whereby the pause time allows heat dissipation in the heating element so as to thereby prevent the overheating thereof.

2. An apparatus for preventing overheating of a heating element, said apparatus comprising:

(a) a first timer for counting a prescribed first time interval;

(b) a second timer for counting a prescribed second time interval;

(c) an evaluation means for evaluating a heat release value of the heating element within said prescribed time counted by either of said first and second timers, on the basis of the number of times of driving of the heating element whilst both of said timers are respectively counting said prescribed times and further adding the total of the heat release value up to that time to said heat release value evaluated previously to evaluate the total of a new heat release value;

(d) a first means for subtracting an allowable heat release value of the heating element for said first time interval from the total of the heat release value and storing the remainder of said subtraction as the total of a new heat release value;

(e) a second means for subtracting an allowable heat release value of the heating element for said second time interval from the total of the heat release value and storing the remainder of the subtraction as the total of a new heat release value; and (f) a driving means for providing a prescribed pause time before driving the heating element only during the time interval counted by said second timer, whereby said pause time allows heat dissipation in the heating element so as to thereby prevent the overheating thereof.

3. A method of preventing overheating of a heating element according to claim 1, wherein said heating element is a line feed motor for use in a printer.

4. An apparatus for preventing overheating of a heating element according to claim 2 wherein said heating element is a line feed motor for use in a printer.

5. An apparatus for preventing overheating of a heating element according to claim 2, wherein said evaluation means for evaluating a heat release value of the heating element is a CPU.

6. An apparatus for preventing overheating of a heating element according to claim 5, wherein said apparatus further includes a ROM for storing a program for execution of a method of preventing overheating of a heating element and for storing fixed data for use in the execution of the method, a RAM for storing any received data in need of the execution of the method of preventing overheating of a heating element and received from the outside, an I/O driver for driving the heating element in conformity with an instruction from said CPU, and a bus line for connecting said CPU, ROM, RAM, timers, and I/O driver together in this order.

* * * * *